Sept. 26, 1961 E. F. MACKS 3,001,806
SEAL

Filed Oct. 14, 1954 2 Sheets-Sheet 1

INVENTOR.
ELMER FRED MACKS
BY
H. E. Whitaker
ATTORNEY

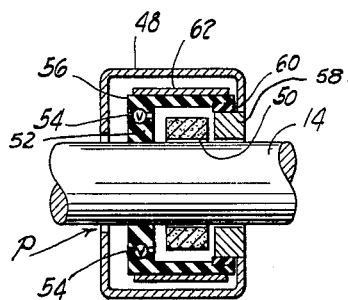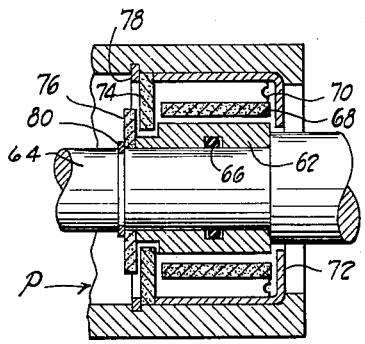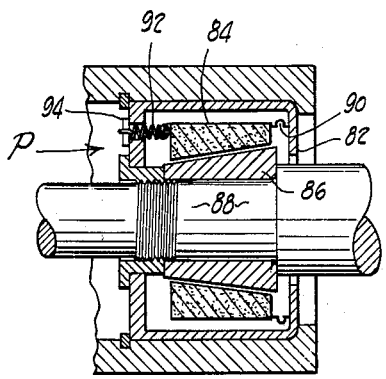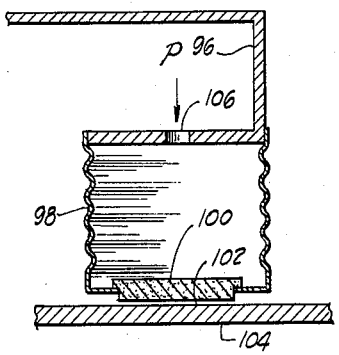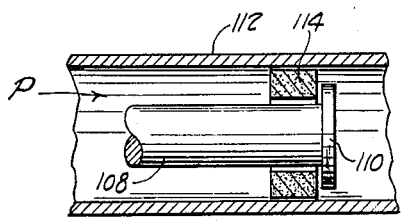

United States Patent Office 3,001,806
Patented Sept. 26, 1961

3,001,806
SEAL
Elmer Fred Macks, Cleveland, Ohio
(Willow Lane, Vermillion, Ohio)
Filed Oct. 14, 1954, Ser. No. 462,195
16 Claims. (Cl. 286—10)

This invention relates to seal assemblies and more particularly to seals in which the sealing element is lubricated during operation by the fluid which is being sealed against, the sealing member being capable of producing a fluid film between the member and other parts of the assembly which positions the member in continuously spaced relation with such other parts.

In general, mechanisms having relatively shiftable parts which are subject to sliding contact require a supply of lubricant to such areas that function as load-carrying surfaces to lessen friction and wear. The surfaces are covered with a lubricant such as oil or grease to obtain a film for separating the surfaces. The adequacy of this method of wear prevention is dependent upon a continuous and adequate supply of the lubricant. Further, the lubricant must be maintained in good condition to support the load-carrying surfaces out of sliding contact. Under conditions of speed and extreme heat, the lubricant loses the necessary ability to maintain the film with the result that wear, damage, and eventual destruction occurs.

The use of the ambient fluid as the film substance constitutes a solution to the ordinary problems attendant to the use of oils and greases. No question of supply exists when the ambient fluid is used, and even in the case of air or a gas, breakdown or loss of lubricating qualities will not result from adverse conditions. The production of an adequate film of fluid for separating relatively moving surfaces is accomplished by properly introducing the fluid at pressures and in quantities which will support the surfaces in operating relationship without physical contact. In many applications of this principle, ambient fluid at the necessary conditions is available in the environment without additional supply facilities being required. This results in obvious reductions in original and maintenance costs since the supply of a lubricant continuously or at regular intervals is eliminated.

To obtain a self-supporting sealing member which will function even with air as the supporting medium, the member may be formed from a foraminous material such as sintered brass which has a large number of tortuous paths for conducting the fluid to the support surface. If there is little resistance to flow at the support surface, a large pressure drop through the foraminous material results. Thus, a very small pressure remains at the support surface to produce the load-carrying film. The reduction of the film pressure would allow the sealing member to approach the associated structure which would increase the resistance of flow through the film area. The flow through the foraminous material would be reduced with the result that the pressure drop therethrough would also be reduced, thus increasing the remaining pressure at the support surface. The supporting ability of the film, therefore, is in direct relation to the proximity of the member producing the film to an adjacent body. This feature renders the assembly selfadjusting and selfregulating as required for continuous operation of a sealing member in spaced relation with adjacent structure.

Accordingly, one of the objects of this invention is to provide a sealing member capable of forming a fluid film between the member and associated structure.

Another object of this invention is to provide a seal assembly which has a permeable, foraminous or perforate member for forming a film capable of supporting the member in spaced relation with other parts of the assembly, thus rendering the member self-supporting.

Other objects and advantages, more or less ancillary to the foregoing, and the manner in which all the various objects are realized will appear in the following description, which, considered in connection with the accompanying drawings, sets forth the preferred embodiment of the invention.

In the drawings:

FIG. 9 is a sectional view of a shaft seal having an auxiliary seal for stationary conditions;

FIG. 10 is a cartridge-type seal for a shaft;

FIG. 11 is a cartridge-type seal having conical sealing elements;

FIG. 12 is a seal for a surface moving translationally relative to the seal; and FIG. 13 is a seal assembly for a hollow shaft.

Figure 1:
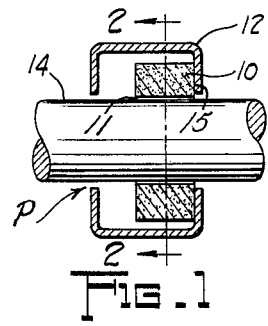
FIG. 1 is a sectional view of a simple form of the improved seal assembly.

In FIG. 1 a seal assembly is shown which includes a ring 10 formed from a foraminous material such as sintered metal. The ring 10 is located within a housing 12 which may be stationary and a part of a machine frame. The ring 10 circumscribes a shaft 14 and a slight clearance or fluid film region 11 is provided between interface 13 of the ring 10 and the shaft 14 so that the shaft 14 may run free of the ring. It is noted that the shaft 14 may be of either the rotating or reciprocating type. In this and the succeeding figures the location of the pressure and the direction in which it tends to move are indicated by the letter P accompanied by an arrow.

The proximity of the interface or inner wall 13 of the ring 10 to the shaft 14 allows the production of a film of fluid which maintains the spacing of the ring 10 relative to the shaft 14. Further, a partial film is formed between side wall 15 of the ring 10 and the inner wall of a housing 12. The ring 10, therefore, is supported out of contact with the shaft 14, and the partial fluid film which is produced between the ring 10 and the housing 12 reduces contact pressure therebetween. The seal is particularly adapted for operation of air since slight leakage of air is generally not objectionable. Shaft and rod seals such as found in air compressors or turbines are particularly suitable to the use of this type of seal which may utilize the air pressure produced by the machine in the seal assembly to obtain the supporting or spacing film.

As shown in FIG. 1 the seal would be urged toward one wall of the housing 12 by the axial pressure difference existing across the seal. Primary leakage is limited therefore to the portion of the ring 10 confronting the shaft 14, which portion is the inner wall 13. This leakage results in a pressure buildup in the fluid film region which locates and positions the ring 10 out of contact with the shaft 14. Since there is negligible frictional force between the shaft 14 and the ring 10 when air is used as the spacing medium, no relative motion will exist between the ring 10 and the housing 12. If frictional drag causes the ring to rotate, an irregularity may be provided on the ring 10 for engaging an irregularity on the housing 12 to prevent rotation. Such an irregularity need not confine the ring 10 radially inasmuch as it is desirable at times to allow radial freedom of ring 10 to accommodate misalignments and deflections.

The pressure available for supporting and positioning the ring 10 is directly related to the flow which is established through the fluid film region 11 between the ring 10 and the shaft 14. As any given portion of the ring 10 shifts away from the shaft 14, the flow increases and the pressure drop through the foraminous wall of the ring 10 at such given portion also increases, thus reducing the pressure and force tending to urge such given portion ring away from the shaft. Concurrently, the clearance is reduced on the diametrically opposite side of the shaft 14 which reduces the flow and increases the pressure and force available to urge the ring 10 away from the shaft 14. Therefore, the foraminous ring cooperates with the shaft 14 to self-regulate the forces acting to position the ring 10 with clearance between the inner wall 13 of the ring 10 and the shaft 14 at all times. Since there is no contact, no wear or deterioration of the ring results from continued relative movement between the ring 10 and the shaft 14.

Figure 2:
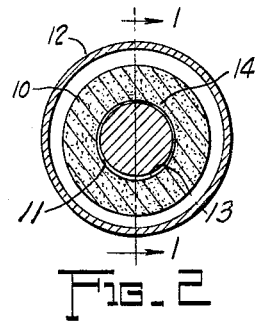
FIG. 2 is a sectional view taken along line 2—2 of FIG. 1.

When a sealing ring 10 is used with a horizontal shaft, the ring 10 would be slightly eccentric relative to the shaft 14 as shown in FIG. 2 due to the effect of gravity operating on the ring 10. However, the ring 10 would position itself essentially concentric to a vertical shaft since the only forces acting on the ring in a radial direction would be those of the spacing film be it gaseous or liquid.

Figure 3:
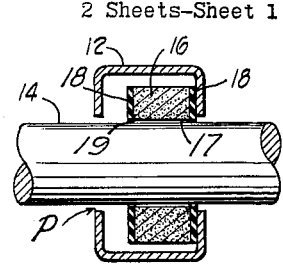
FIG. 3 is a sectional view of a shaft seal in which the sealing ring has impervious axial extremities.

In FIG. 3 a seal assembly is shown having a permeable ring 16 with its inner wall 17 slightly spaced from the shaft 14. The sealing ring 16 has a nonpermeable coating 18 covering either one or both end faces to prevent flow of fluid therefrom. This coating may be burnished to close the pores or it may be a resilient material to provide better end face sealing. The closed surface may be faced off as required by the mating surface on the housing 12. The provision of the coated ends on the ring 16 limits leakage to the area 19 between the ring 16 and the shaft 14.

It will be seen that the only difference between the embodiment of FIGURE 1 and the embodiment of FIGURE 3 is the impervious side wall surfaces 18 of FIGURE 3. In both FIGURES 1 and 2 the fluid under pressure being sealed would be at the left. In FIGURE 1 fluid flows through both the left hand side wall of the annular sealing member 10 and the peripheral extremity thence through the permeable body and out the inner surface 11 or the right hand side wall 15. In the case of the embodiment of FIGURE 3 the fluid also flows, generally speaking, from the left to the right. However, the nonpermeable side walls 18 minimize the flow and cause it to be only substantially radially through the annular sealing ring 16.

Figure 4:
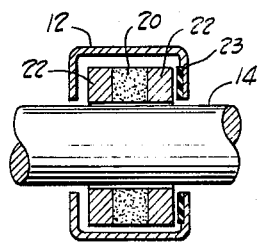
FIG. 4 is a sectional view of a shaft seal having a split ring.
Figure 4:
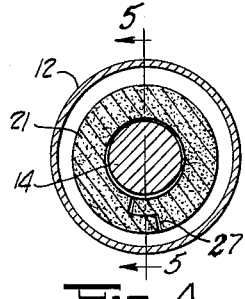
Figure 5:
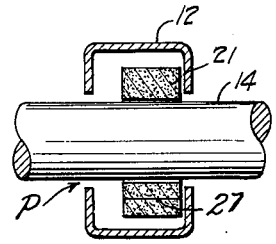
FIG. 5 is a sectional view taken along line 5—5 of FIG. 4.

In FIGURES 4 and 5 a seal assembly is shown having ring 21 split at 27. The sealing functioning of the ring is identical to the device of FIGURE 1. The difference is that since the ring 21 is split, flexure thereof produces changes in the inside diameter. This flexure allows automatic spacing relative to the shaft 14. The close dimensional tolerances which may be required in solid rings are eliminated by the provision of the split ring. An overlap, as shown, minimizes leakage at the joint in the ring 21. An alternate form of overlap is indicated in FIG. 6.

Figure 6:
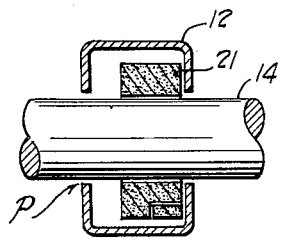
FIG. 6 is a sectional view similar to FIG. 5.

The embodiments of FIGURES 4 through 6 differ from the embodiment of FIGURE 1 only in that these latter embodiments disclose split rings. The purpose of the split in the rings is primarily to permit the through passage in the annular ring 21 to be less accurately machined than is required in the ring 10 of FIGURE 1. Additionally the split will compensate for such problems as differing coefficients of expansion between the ring and the shaft in installations where relatively large temperature changes are encountered. In all respects other than the fact that the split permits the ring to expand or contract, the functioning of the devices of FIGURES 4 through 6 is identical with that of FIGURE 1. It will also be apparent that the features of FIGURE 3 and the subsequently described embodiments can be used in combination with the split concepts of FIGURES 4 through 6.

Figure 7:
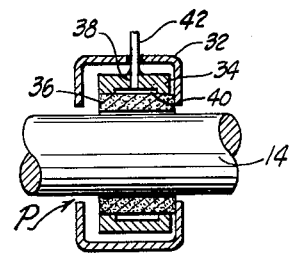
FIG. 7 is a sectional view of a shaft seal in which an auxiliary supply of fluid under pressure is employed.
Figure 8:
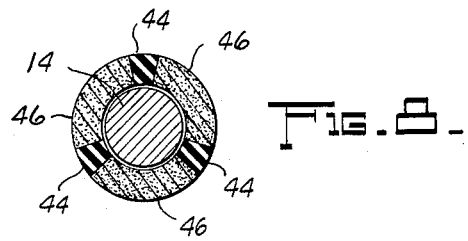

A sealing assembly wherein a secondary fluid is also used as the sealing fluid and having the structure adaptable to the housing shown in FIG. 1 is illustrated in FIG. 7. An apertured housing 32 retains a rigid ring 34 to which a flexible foraminous member 36 is affixed in confronting relationship to the shaft 14. A passage 38 in the ring 34 opens into a cavity 40 in the ring 34. A flexible conduit 42 connects a secondary source of fluid through the passage 38 and passes through the wall of the houing 32. The flexible foraminous member 36 is capable of adapting its shape to conform to the dimensions of the shaft 14 but yet not touch the shaft 14 while the rigid ring 34 supports and maintains the permeable member 36 in a generally circular shape.

FIGURE 7 discloses an embodiment which can encompass the features of any of the preceding figures. It functions in a very similar manner. The difference is that the device of FIGURE 7 has an auxiliary source of fluid pressure to provide the spacing and sealing film between the permeable member 36 and the shaft 14.

Figure 8:
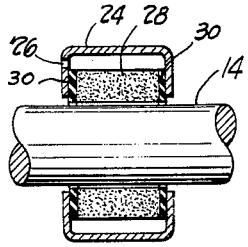
FIG. 8 is a sectional view of a resilient sealing element.

Flexibility in the foraminous ring may also be obtained by segments of resilient material, which may be permeable or non-foraminous as desired, disposed between segments of rigid foraminous material. In FIG. 8 the flexible segments 44 are located between rigid foraminous segments 46. The existence of the flexible material allows the ring to change diameter to a small degree which renders the ring self adjusting since the segments 46 would be positioned relative to the shaft 14 by the pressure in the film between the shaft 14 and the segment 46. The entire foraminous ring may be made flexible and resilient if desired.

The embodiment of FIGURE 8 is applicable with any of the previously disclosed embodiments. It can be considered to be another means of obtaining the advantages of the embodiments of FIGURES 4 through 6. It can also be used as an additive means of permitting radial expansion of the permeable ring and used in combination with the split ring shown in FIGURES 4 through 6.

To obtain positive sealing at static conditions while retaining the advantages of the foraminous seal ring when motion is involved, an auxiliary valving is provided as shown in FIG. 9. A housing 48 retains a foraminous seal ring 50 in a spaced sealing position relative to shaft 14. A ring 52 is affixed to the shaft 14 and carries a circumferential pivot which opens upon pivotal movement in the assembly.

A circumferential pivot illustrated in FIGURE 9 is operated by a flexible sleeve which may be elastomeric in form such as rubber which expands and increases in circumference as rotation of the shaft occurs. With this increase in circumference of the portion parallel to the axis of the shaft, the pivotal action occurs which opens ports in the more rigid portion of the valve assembly.

A resilient sleeve 56 is carried by the pivot 54 and has a diameter greater than the outer diameter of the permeable sealing ring 50. The end of the sleeve 56 opposite the pivot 54 overlies a shoulder 58 formed on the housing 48. A soft gasket 60 lies between the sleeve 56 and the shoulder 58 to effect a fluid-tight seal therebetween. A series of weights 62 is affixed to the sleeve 56 and the weights are spaced circumferentially therearound. Upon rotation of the shaft 14, the sleeve 56 is rotated and the weights 62 pull the sleeve away from the shoulder 58, thus allowing fluid to enter the space around the foraminous sealing ring 50 which passes therethrough and produces the spacing film between the ring 50 and the shaft 14. As long as the shaft 14 continues to rotate, the sleeve 56 will remain in the expanded condition, thus eliminating rubbing and wear. Under this condition the sealing against leakage of the fluid from the housing would be accomplished by the sealing ring 50 which floats relative to the shaft 14 without physical contact therewith. When motion in the shaft 14 ceases, the sleeve 56 contracts and bears against the gasket 60 and the shoulder 58. Therefore as long as the shaft 14 remains motionless, there is no possibility of leakage through the seal since deterioration cannot occur in the auxiliary sealing assembly during operation.

In the embodiment of FIGURE 9 the ring 50 is just like hte ring 10 of FIGURE 1. Its functions in an identical manner. The device of FIGURE 11 differs from the device of FIGURE 1 only in that the auxiliary sealing means for nonrotative conditions identified by the numerals 52 through 68 has been added.

A seal assembly may be provided in cartridge form wherein the elements are preadjusted. This construction is illustrated in FIG. 10 as having a bushing 62 mounted on a shaft 64 with an O-ring seal therebetween to prevent leakage along the shaft. The provision of the seal 66 eliminates the need for close fits between the shaft 64 and the bushing 62. A sleeve 68 is formed of a permeable or foraminous material and has its inner wall accurately sized to allow a clearance space between the sleeve 68 and the bushing 62. The sleeve 68 is attached to a flexible diaphragm 70 which seals against leakage around the outside of the sleeve 68. The diaphragm 70 allows the sleeve 68 to shift radially relative to the bushing 62. This renders the seal self-adjusting since the flow of fluid through the sleeve 68 forms a supporting film on the surface of the bushing 62. The diaphragm 70 is held by a cage 72 which fits the inner wall of a seal housing. The cage 72 also supports a ring 74 of filter material which absorbs dirt or other foreign material which would tend to clog the sleeve 68. A second ring 76 is carried by the bushing 62 and is permeable to passage of fluid into the interior of the housing. The ring 76 prevents the passage of unfiltered fluid through the annular space between the bushing 62 and the ring 74. The cage 72 is held in assembled relation with the seal housing by a snap ring 78 and the bushing 62 is held in position by a snap ring 80 engaged with the shaft 64. The preassembled cartridge-type seal assembly may be installed and placed in operation by merely adjusting snap rings 78 and 80. No adjustments to the seal itself are required.

A second type cartridge seal is shown in FIG. 11 as having a cage 82 surrounding a permeable or foraminous sealing ring 84. The ring 84 has a conical inner wall which confronts a complementary conical surface formed on a bushing 86 mounted on a shaft 88. It is noted that the conical surface on the bushing 86 could be formed directly on the shaft 88 since the manufacturing tolerances would be increased by the use of the conical configuration.

A flexible diaphragm 90 lies between the cage 82 and the ring 84 and prevents leakage of fluid around the end of the seal without imposing a restraining force on the ring 84. The diaphragm 90 being extremely flexible in a radial direction, the ring 84 is positioned and carried by the film of fluid which lies intermediate the ring 84 and the bushing 86. Since the cross section of the ring 84 tapers, the fluid under pressure tends to urge the ring 84 in the direction toward the small end thereof. A tension member in the form of a spring 92 is affixed to the ring 84 and has an adjusting screw 94 carried by the cage 82 for adjustably holding the opposite end of the spring 92. The spring 92, therefore, may be adjusted to balance the fluid force on the ring 84 and both lateral and radial self-adjustment of the seal would be obtained. The axial restraining spring may be in the form of any resilient material and may be located on either the high or low pressure faces of the foraminous member, depending on whether tension or compression action is desired.

The seals disclosed above are provided primarily for rotating or reciprocating shafts. However, a seal utilizing the principle of the above seals and capable of functioning on a surface being moved translationally is shown in FIG. 12. A chamber 96 which contains the fluid under pressure which is to be retained therein supports a bellows 98 to which is affixed a permeable or foraminous member 100 which may be flexible or resilient. The member 100 has a face 102 which confronts the surface of a moving object 104. Since the bellows 98 allows motion of the foraminous member toward and away from the chamber 96, the surface of the object 104 may be irregular, flat, curved, or have a compound curvature and the seal will function to prevent leakage from the chamber 96. The spaced relationship between the foraminous member 100 and the object 104 will be maintained by the existence of the supporting film therebetween which is established by the flow of fluid in small quantities through the member 100. The fluid is conducted to the bellows through a passage 106 formed in the supporting structure for the seal assembly.

In FIG. 13 a modification of the invention is shown wherein a hollow rotating shaft is sealed against axial flow of fluid. A stationary member 108 disposed within the shaft 112 has a flanged end 110. The flange end 110 presents a shoulder for engaging a ring 114 which is foraminous to the fluid being sealed against. The outer face of the ring is spaced slightly from the inner wall of the shaft 112 and is positioned by the supporting film of the fluid developed by the foraminous ring 114. The ring 114 automatically adjusts its position so that physical contact does not occur between the ring 114 and the rotating shaft 112. The operation of the seal shown in FIG. 13 differs from the operation of the seal shown in FIG. 1 in one respect only. In the seal of FIG. 13, the ring 114 is supported by a film of fluid developed at the outer face of the ring while in FIG. 1 the ring is supported by a film of fluid developed at the inner face of the ring.

In order to minimize seal vibration, certain values of expansion ratio and volume factor have been found to be desirable. The permeability of the material used in the sealing member is controlled so that under normal conditions the fluid expansion ratio through the seal is less than 11, which value limits the volume of flow through the film, thus eliminating vibration in the sealing member.

The volume of fluid directly connected to the film must also be restricted to a value at which vibration of the seal will not occur. The volume factor is obtained by the relationship of the volume of the hollowing or grooves in the sealing surface to the area of the seal. This factor should be no greater than $2 \times 10^{-3}$ for optimum results in the operation of the seal.

Although the foregoing description is necessarily of a detailed character, in order that the invention may be completely set forth, it is to be understood that the specific terminology is not intended to be restrictive or confining; and that various rearrangements of parts and modifications of design may be resorted to without departing from the scope or spirit of the invention as herein claimed.

What is claimed is:

1. A fluid seal assembly comprising a movable body having a smooth surface, a housing, and a foraminous member carried within the housing in floating relationship both longitudinally and transversely with both said body and said housing, the foraminous member having a smooth surface complemental to the body surface and another surface exposed to a quantity of fluid under pressure when the device is in operation, said member smooth and exposed surfaces being in communication with one another through said foraminous member, said complemental surfaces defining a fluid film producing region, said complemental surfaces being in at least partial contact when the device is not in operation, said complemental surfaces being held in spaced relationship by a spacing film of the fluid being sealed generated in said region when the device is in operation, the fluid in said film being supplied at least in part by fluid flowing from said exposed surface through said member to said region, and said housing being spaced from said shaft a greater distance than said smooth complemental surface of said foraminous member.

2. The device of claim 1 wherein the fluid is a gas.

3. The device of claim 1 wherein a flexible diaphragm means joins the member to said housing preventing leakage therebetween.

4. The device in claim 1 wherein the member is a first ring and wherein a second ring having a transverse hole therethrough surrounds the first ring and is connected thereto, and wherein a flexible auxiliary fluid supply tube passes through the housing and is connected to the hole.

5. The device of claim 4 wherein the first ring is flexible and the second ring is rigid.

6. The device of claim 4 wherein the rings define a fluid cavity therebetween and wherein the hole communicates with the cavity.

7. The device of claim 1 wherein said member is a flexible ring.

8. The device of claim 1 wherein the body, housing and member are each annular and the body is a bushing positionable on a shaft and projecting in part into said housing to prevent axial separation of the housing and bushing.

9. The device of claim 1 wherein the housing includes a filter positionable between the member and a source of fluid being sealed against.

10. A seal assembly comprising, an annular bushing member, an annular housing member surrounding the bushing member, a foraminous sealing ring carried within the housing member and surrounding the bushing member, the ring and the bushing member having complemental film-producing surfaces, a resilient diaphragm connecting the ring to the housing member and preventing the flow of fluid therebetween, said housing member including inwardly directed portions overlying portions of the bushing member to prevent the axial separation of the members, and at least one of the members including a filter positionable between the ring and a pressure chamber to be sealed.

11. The device of claim 1 wherein the housing is a resilient chamber defining element connected to the member.

12. The device of claim 1 wherein the body is a shaft and the member is a ring surrounding the shaft and having spaced end surfaces at least one of which is sealed against the flow of fluid, and wherein said complemental surfaces are cylindrically contoured.

13. The device of claim 12 wherein said one end surface of the ring is sealed by a resilient imperforate end facing.

14. The device of claim 1 wherein the body is a shaft and the member is a ring surrounding the shaft and having spaced end surfaces, and wherein said complemental surfaces are cylindrically contoured, and wherein a resilient imperforate end facing seals each of said end surfaces.

15. The method of sealing a fluid chamber defined at least in part by first and second spaced members comprising, positioning a foraminous body between the members in floating relationship both transversely and longitudinal of both members, causing the pressure of the fluid being sealed against to urge the body into sealing engagement with the first member, generating a film of the fluid being sealed against in a region defined by complemental surfaces on the body and the second member by passing a portion of the fluid being sealed against through the body and into the fluid film region to maintain the body and the second member in floating spaced apart relationship when there is fluid under pressure in the chamber, and allowing continuous limited escape of fluid from said region from an end of the region remote from the chamber.

16. The method of sealing a quantity of gas under pressure in a chamber defined at least in part by a housing having an aperture and a shaft extending through the aperture comprising, positioning a foraminous ring around the shaft and in an annular recess in the housing, allowing the ring to float both radially and axially relative to both the housing and the shaft, generating a load carrying and sealing film of the fluid being sealed against in a fluid film region between the ring and the shaft by allowing gas to pass through the ring from a surface exposed to the chamber to the fluid film region defined by the inner surface of the ring and a complemental surface on the shaft, and supporting the ring on said film to maintain the ring in spaced relationship with the shaft while allowing fluid to escape axially from said region at the end remote from the chamber.

References Cited in the file of this patent

UNITED STATES PATENTS

| | | |
|---|---|---|
| 629,136 | Sciama | July 18, 1899 |
| 2,075,444 | Koehring | Mar. 30, 1937 |
| 2,442,202 | Caley | May 25, 1948 |
| 2,445,227 | Le Clair | July 13, 1948 |
| 2,473,139 | Dickerman | June 14, 1949 |
| 2,554,234 | Baudry et al. | May 22, 1951 |
| 2,571,868 | Haller | Oct. 16, 1951 |
| 2,645,534 | Becker | July 14, 1953 |
| 2,680,410 | Kolb | June 8, 1954 |
| 2,683,636 | Wilcox | July 13, 1954 |

UNITED STATES PATENT OFFICE

CERTIFICATION OF CORRECTION

Patent No. 3,001,806                                          September 26, 1961

Elmer Fred Macks

It is hereby certified that error appears in the above numbered patent requiring correction and that the said Letters Patent should read as corrected below.

In the drawings, the left-hand one of the two figures labeled Fig. 4 and the uppermost one of the two figures labeled Fig. 8, should be cancelled; column 5, line 16, for "hte" read -- the --; same line, for "Its" read -- It --.

Signed and sealed this 17th day of April 1962.

(SEAL)
Attest:

ESTON G. JOHNSON
Attesting Officer

DAVID L. L. LADD
Commissioner of Patents